(12) United States Patent
Mangano (10) Patent No.: US 7,841,478 B2
(45) Date of Patent: Nov. 30, 2010

(54) SELF-CLEANING FILTER AND FILTRATION SYSTEM FOR LUBRICANTS

(76) Inventor: Remy Mangano, 21 Ave. du CEP, Poissy (FR) 78300

( * ) Notice: Subject to any disclaimer, the term of this patent is extended or adjusted under 35 U.S.C. 154(b) by 671 days.

(21) Appl. No.: 11/925,251

(22) Filed: Oct. 26, 2007

(65) Prior Publication Data

US 2009/0107904 A1    Apr. 30, 2009

(51) Int. Cl.
*B01D 29/62* (2006.01)
*B01D 29/68* (2006.01)
*B01D 29/94* (2006.01)

(52) U.S. Cl. .................. 210/411; 210/333.1; 210/232

(58) Field of Classification Search .......... 210/232, 210/411, 333.1
See application file for complete search history.

(56) References Cited

U.S. PATENT DOCUMENTS

| | | | | |
|---|---|---|---|---|
| 2,008,598 | A | * | 7/1935 | Seeley .................. 210/393 |
| 2,310,587 | A | * | 2/1943 | Macneill ................ 210/411 |
| 2,985,306 | A | * | 5/1961 | Statzell ................. 210/130 |
| 3,739,914 | A | * | 6/1973 | Moatti .................. 210/333.1 |
| 4,636,311 | A | * | 1/1987 | Litzenburger ........... 210/323.2 |

FOREIGN PATENT DOCUMENTS

FR        2889666 A1 *  2/2007

* cited by examiner

*Primary Examiner*—Thomas M Lithgow
(74) *Attorney, Agent, or Firm*—Vedder Price P.C.

(57) ABSTRACT

The disclosed self-cleaning filtration system and self-cleaning filter solves various problems by replacing a standard filter cartridge with an adapter screwed in place of the cartridge, a filter of limited size with a motor for rotating an inlet cover plate and an outlet cover plate over a body with a plurality of longitudinal channels inside of a circumferential filtration media where the different parts of the media are used alternately in forward and backward flow. As the cover plates rotate, each longitudinal channel comes in successive fluidic communication with either an entry opening where oil is pushed in the longitudinal channel through the filtration media and into an external cavity where filtered oil is reintroduced in the engine, or the longitudinal channel comes in fluidic communication with a drain opening where the flow through the filtration media is reversed and oil from the external cavity is pushed back into the longitudinal channel to transport stored debris into a decanter for storage, elimination, decantation and reuse. In another embodiment, instead of entry and drain openings, the oil is placed directly in contact with each longitudinal channel with the exception of the channel in fluidic communication with the drain opening. The self-filtration system includes a self-cleaning filter used in tandem with an adapter, a decanter, and a series of hoses.

20 Claims, 6 Drawing Sheets

SELF-CLEANING FILTER AND FILTRATION SYSTEM FOR LUBRICANTS

FIELD OF THE DISCLOSURE

The present invention relates to a self-cleaning filtration system for lubricants, and in particular, to the filtration of lubricating fluids such as oil used by internal combustion engines.

BACKGROUND

Engines use oil or other lubricants to enhance conductive heat transfer and to prevent overheating by limiting friction. Viscous fluids also serve as a limited leakage containment system and help reduce noise and vibrations within the engine when in operation. As fluids are used in the engine, they are degraded by coming into contact with small particles of metal or dirt from external sources. As oil degrades, it must be regenerated through replacement, introduction of new oil, filtration, or a combination thereof.

One of the most common method of filtration is the use of filtering cartridges secured to the engine where oil circulates. Traditional filters include a filtration media designed to trap particles of dirt and other residue as the oil migrates through the filtration media. Filtration through filtration media requires a driving force, often a pressure differential between the oil inlet and the oil outlet in the filter. As the filtration media traps dirt, the pressure required to push the oil through the filter increases. Because static filters are incapable of evacuating the dirt and residue, the filter increases in weight and reduces the overall efficiency of the engine. All static filters clog and thus require a release valve to bypass the filtration media. When these bypasses are opened, the filtration activity drops to zero.

Filter replacement requires the purchase, temporary storage, and installation of new filters. Discard of these filters also produces waste in the form of the casing in which the filtration media is stored. In addition to the cost associated with the purchase and maintenance of these filters, the loss of engine efficiency results in a higher fuel and oil cost for internal combustion engines.

What is needed is a self-cleaning filter of compact geometry that is capable of replacing cartridge filters known in the industry and improving engine efficiency.

SUMMARY

The disclosed self-cleaning filtration system and self-cleaning filter solves various problems by replacing a standard filter cartridge with an adapter screwed in place of the cartridge, a filter of limited size with a motor for rotating an inlet cover plate and an outlet cover plate over a body with a plurality of longitudinal channels inside of a circumferential filtration media where the different parts of the media are used alternately in forward and backward flow. As the cover plates rotate, each longitudinal channel comes in successive fluidic communication with either an entry opening where oil is pushed in the longitudinal channel through the filtration media and into an external cavity where filtered oil is reintroduced in the engine, or the longitudinal channel comes in fluidic communication with a drain opening where the flow through the filtration media is reversed and oil from the external cavity is pushed back into the longitudinal channel to transport stored debris into a decanter for storage, elimination, decantation and reuse. In another embodiment, instead of entry and drain openings, the oil is placed directly in contact with each longitudinal channel with the exception of the channel in fluidic communication with the drain opening. The self-filtration system includes a self-cleaning filter used in tandem with an adapter, a decanter, and a series of hoses.

BRIEF DESCRIPTION OF THE DRAWINGS

Certain embodiments are shown in the drawings. However, it is understood that the present disclosure is not limited to the arrangements and instrumentality shown in the attached drawings, wherein.

DETAILED DESCRIPTION

The present invention is not limited to the particular details of the device depicted, and other modifications and applications may be contemplated. Further changes may be made in the above-described device without departing from the true spirit and scope of the invention herein involved. It is intended, therefore, that the subject matter in the above depictions should be interpreted as illustrative, not in a limiting sense.

Figure 1:
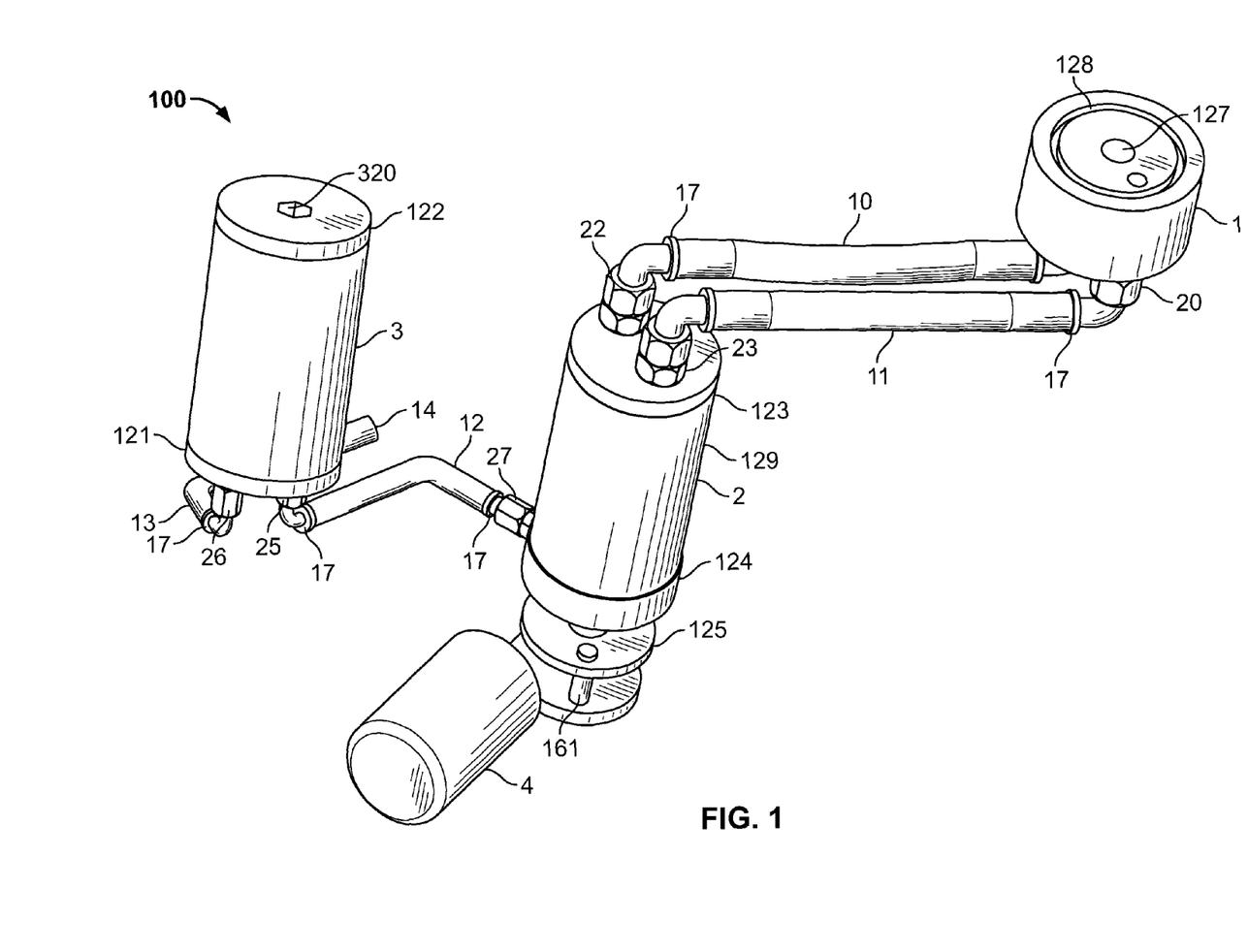
FIG. 1 is a perspective view of the self-cleaning filtration system for lubricant as installed on an engine according to a first embodiment of the present disclosure.

FIG. 1 is a perspective view of the self-cleaning filtration system 100 for lubricants installed on an engine (not shown) according to a first embodiment of the present disclosure. While the different figures show the different elements of a filtration system, what is not shown as is customary in the art is the lubricant itself, which is a viscous liquid contained and confined within the filtration system 100 that surrounds and covers all internal parts of the system 100. What is understood by one of ordinary skill in the art of engine lubrication is the need to prime and fill the entire system 100, with oil or other lubricant to permit the free flow of lubricant within the system. What is also not shown is the use of the filtered lubricant as an internal lubricant within the self-cleaning filtration system 100, or the technology associated with the different methods of fixation of the elements where self-cleaning filtration is needed. Fixation methods vary extensively from system to system, and as shown in FIG. 2, a long length of hose 15 attached 16 may be provided along with any number of quick connect fasteners 17 (four shown) that must be inserted by a mechanic on the ends of the hose once it is cut into smaller segments for installation.

Figure 2:
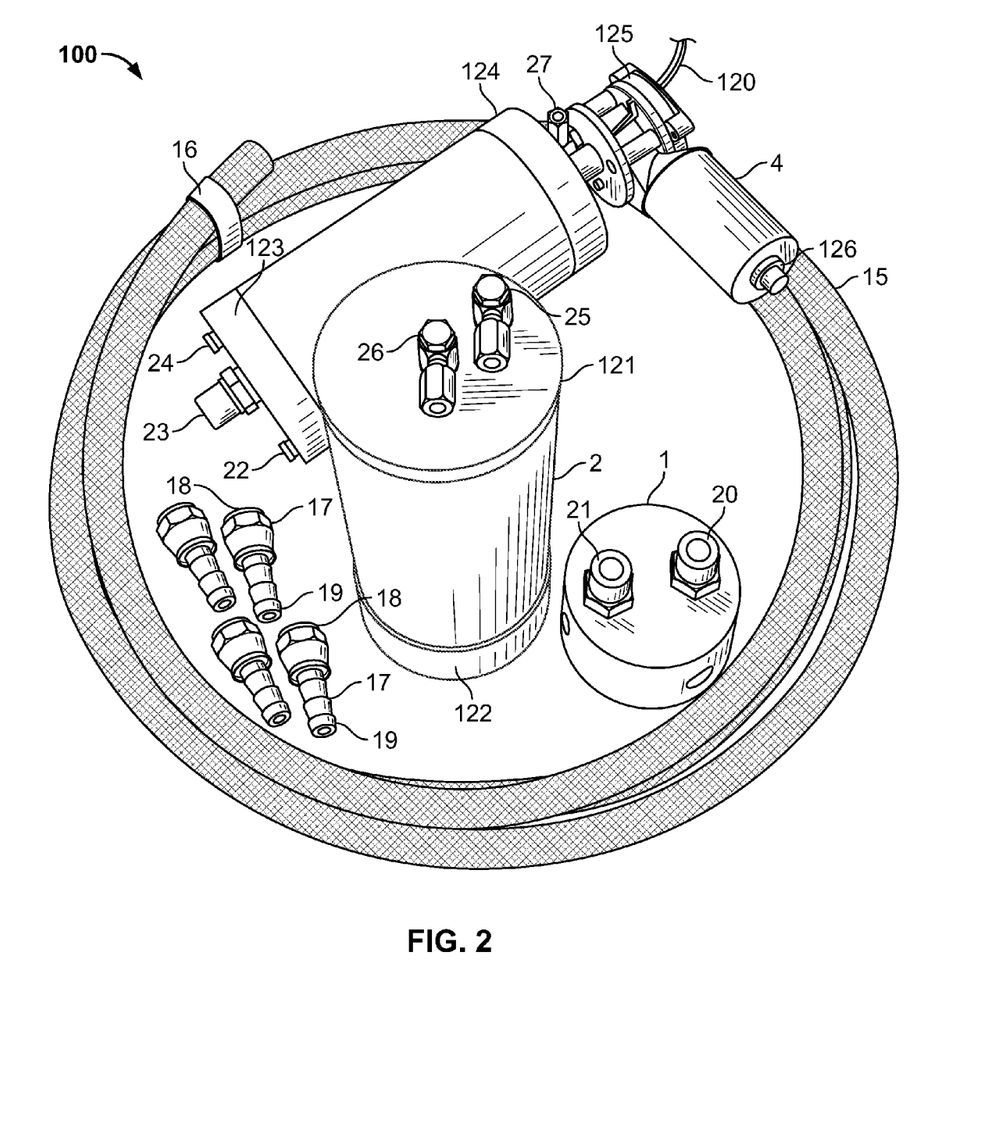
FIG. 2 is a perspective view of the self-cleaning filtration system for lubricant as supplied before installation according to another embodiment of the present disclosure.

What is also shown in FIG. 2 is the electrical connection 120 of the motor 4, which is also to be connected by a mechanic to an adequate and available power source. Finally, FIG. 2 shows one technology of quick-connect fasteners 17 that are clipped in the different locations shown as 20 to 27 to functionally assemble the system 100 as shown in FIG. 1. FIG. 1 illustrates a system 100 having a self-cleaning filter 2 located below the adapter 1. The decanter 3 is also shown at a position in height similar to the self-cleaning filter 2. While the placement of the decanter 3 in a vertical orientation as shown is preferred to insure that the drain of the decanter 14 remains below the level of sludge within the decanter 3, what is contemplated is the use of a decanter 3 in any orientation and attitude compared to the self-cleaning filter 2 SO long as sufficient driving force is created, maintained, or assured to push the sludge through a third hose 12. In one embodiment (not shown), the drain 14 and the fasteners 25, 26 of the decanter 3 are located above the main cylindrical body 272. By placing the fasteners above the body 272, debris can be decanted by gravity.

What is also shown is the use of hexagonal bolts and counter-bolts to secure and assemble the different segments of the system 100. What is contemplated as an assembly mechanism as the best mode is a system using the technology preferred in any technology. What is shown in FIG. 1 is an embodiment in the automotive industry. In addition, while flexible, low-pressure hosing 15 is shown in FIG. 2, the hose is assembled in FIG. 1 into a first hose 10, a second hose 11, a third hose 12, and a fourth hose 14. The hosing 15 made of a polymer-based material. What is also contemplated is the use of high-pressure hose (not shown) having a metal netter over the external surface of the hose or the use of rigid pipes at even higher pressure or at greater operating temperatures.

What is shown in FIG. 1 is a self-cleaning filtration system 100 for lubricants (not shown) having an adapter 1 connected to a mechanical apparatus through the connecting interface 128. The connecting interface 128 may include a seal as shown, and be attached to the mechanical apparatus using threaded oil lines 127. What is shown as 127 corresponds to a series of openings, shown in FIG. 1 as circular openings, where the unfiltered lubricant is found and where the filtered lubricant is returned to the piece of mechanical equipment.

The adapter 1 includes an outlet and an inlet 127 for the transfer of lubricant to and from the piece of mechanical equipment to the system 100. Since most automobile engines are designed to use circular filter cartridges, what is shown as the adapter 1 in FIG. 1 is a thick, circular plate with bottom connectors 20, 21 (as shown in FIG. 2). The two bottom connectors 20, 21 are connected to a first hose 10 connecting the external cavity shown in FIG. 6 with the filter outtake 21, and a second hose 11 connecting each of the entry openings also shown in FIG. 6 with the filter intake 20. Each of the first and second hoses 10, 11 are attached at each extremity via connectors 20-23 using either a socket less fitting, a quick-connect fastener 17, a nut and a counter-nut, and a 90-degree angle connection or any other hose fastening system generally known and used in the art. The adapter also includes a filter intake 20 and a filter outtake 21.

Figure 3:
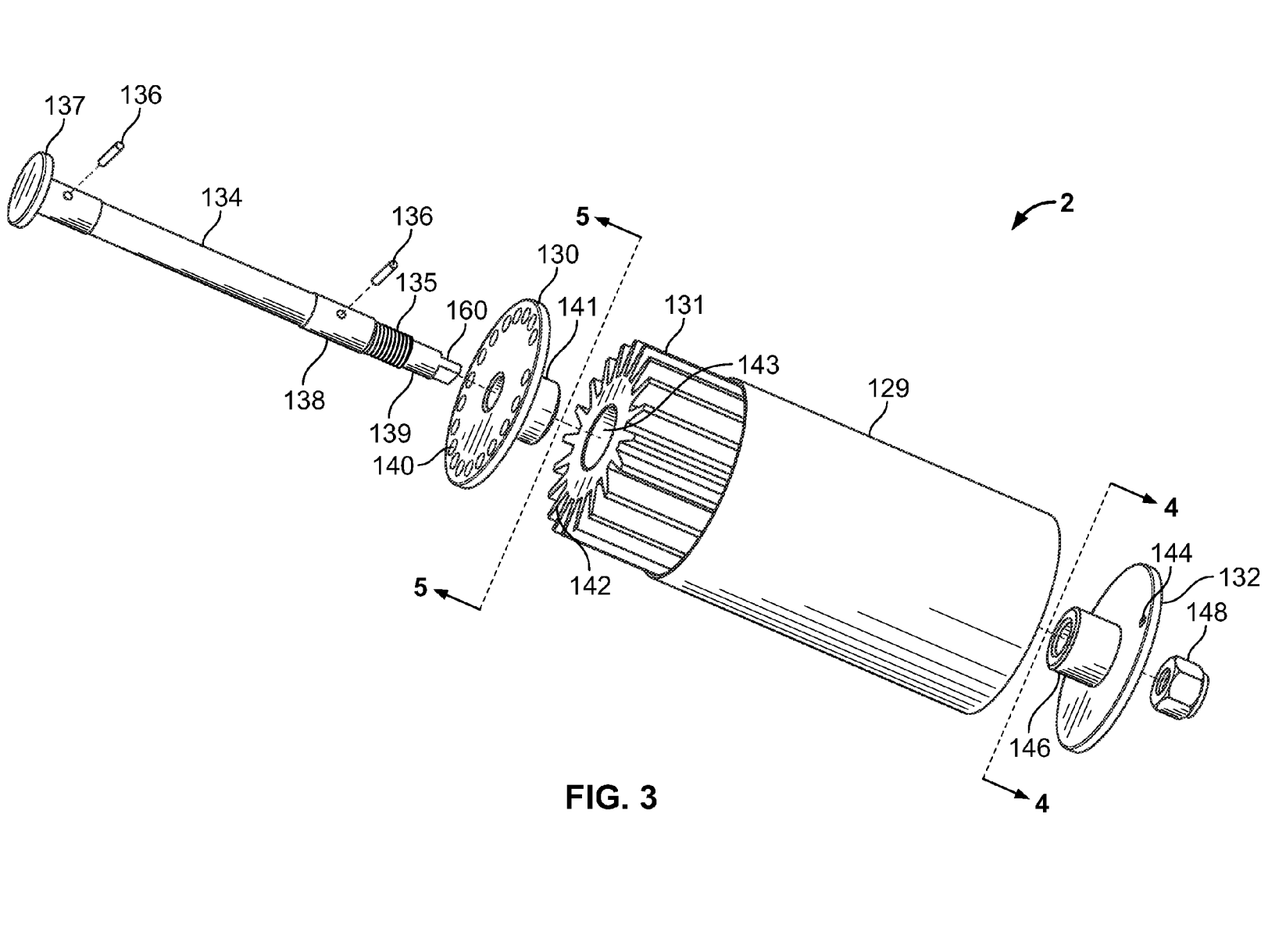
FIG. 3 is an exploded perspective view of part of the internal elements of the self-cleaning filter for a lubricant shown as part of the self-cleaning filtration system of FIG. 1 according to another embodiment of the present disclosure.
Figure 6:
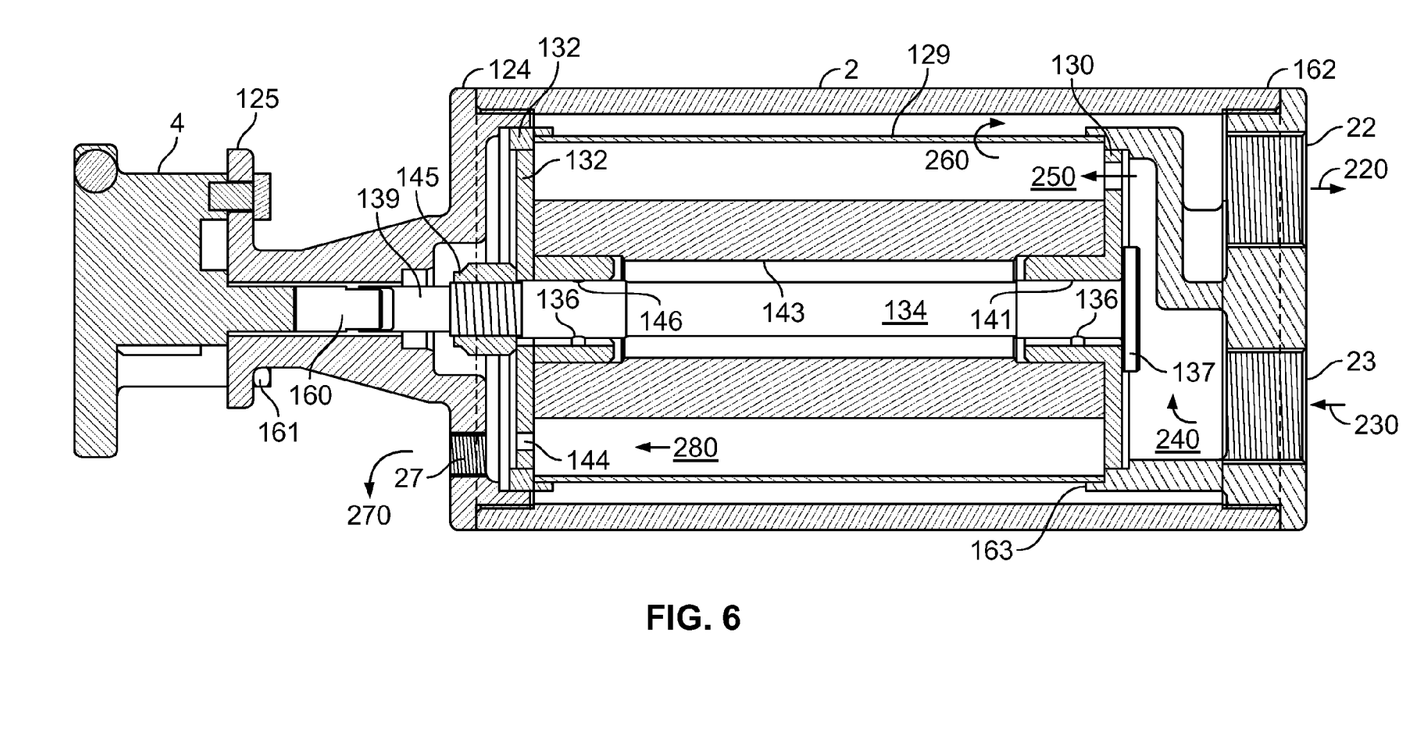
FIG. 6 a plan view of the self-cleaning filter as part of the self-cleaning filtration system as shown in FIG. 1 according to another embodiment of the present disclosure.

The system 100 also includes a self-cleaning filter 2, as shown in greater detail in FIG. 3, having a body 131 including a first end, a second end in opposition, a plurality of longitudinal channels 142 between the first end and the second end, a filtration media 129 external to the body 131 enclosing the plurality of longitudinal channels 131, which is in contact with a rotating inlet cover plate 130 at the first end, and a rotating outlet cover plate 132 at the second end. The body 131 as shown has an internal opening 143 to allow the shaft 134 to be slid into the body as shown in FIG. 6. The body 131 in the best contemplated mode is made of aluminum and has a plurality of radial ridges forming the different longitudinal channels 142. What is contemplated is the use of any metal to form the body 131. What is contemplated is the use, via the body 131, of a geometry capable of creating different internal segments over the surface of the filtration media 129 where a forward flow and a backward flow of lubricant can be created using alternate openings in the inlet cover plate 130 and outlet cover plate 132.

What is shown in FIG. 3, is a body 131 of constant diameter with longitudinal channels 142 connected to a circular inlet cover plate 130 and a circular outlet cover plate 132. The inlet cover plate 130 includes a plurality of entry openings 140, shown as small, circular openings, each in fluidic communication with a different longitudinal channel 142 from all of the longitudinal channels situated around the body 131. FIG. 6 shows how an unfiltered lubricant 230 coming in from the first hose 11 is directed as shown by arrow 240 through the entry opening 250 into one of the longitudinal channel 142 (not shown). Arrow 260 shows how the lubricant is then pushed via pressure filtration through the filtration media 129 into an external cavity 271 leaving any filtered debris within the longitudinal channel 142 or attached to the internal surface of the filtration media 129 in direct contact with the longitudinal channel 142.

Referring back to FIG. 3, in one embodiment, the outlet cover plate 132 includes at least one drain opening 144 in fluidic communication with one of the longitudinal channels 142 of the body 131 and where the other end does not have an entry opening 140 for draining the filtered debris away from the longitudinal channel 142. What is contemplated is the use of a drive mechanism 4, such as a 12-volt DC electric motor or an hydraulic drive (not shown) or a 24-volt DC electric motor, connected to a drive shaft 134 and the body 131 alternately placing the at least one drain opening 144 in fluidic communication with each of the longitudinal channels 142 in succession. As the drive mechanism 4 rotates the drive shaft 134 in unison with the inlet cover plate 130 and the outlet cover plate 132, the longitudinal channels 142 rotate either clockwise or counterclockwise or in an alternating fashion to create a regeneration cycle of the filtration media 129 where a single section of filtration media 129 serves as a filter most of the time but is subject to counterflow pressure made to dislodge the dirt, metal particles, or other debris from the internal surface of the filtration media 129 when the flow is reversed. In one embodiment, the drive shaft 134 is rotated at 15 to 30 rotations per minute. FIG. 6 further shows how during the counterflow (shown by the lower longitudinal channel 142) directs the lubricant 280 charged with dirt or debris through the drain opening 144 down 270 into the decanter 3 via a third hose 12 connecting the at least one drain opening 144 to a decanter 3 for storage of filtered debris.

Figure 7:
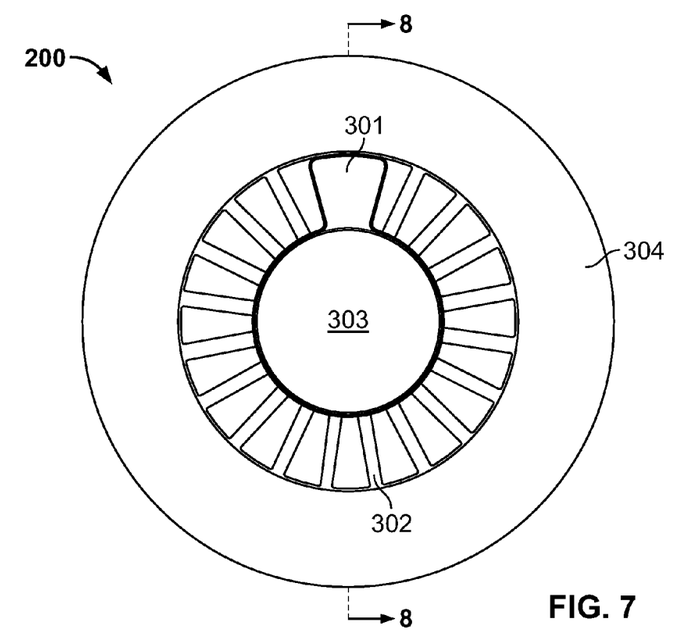
FIG. 7 is an elevation of an alternate embodiment of the inlet cover plate of FIG. 5 on the internal elements of the self-cleaning filter for a lubricant.
Figure 8:
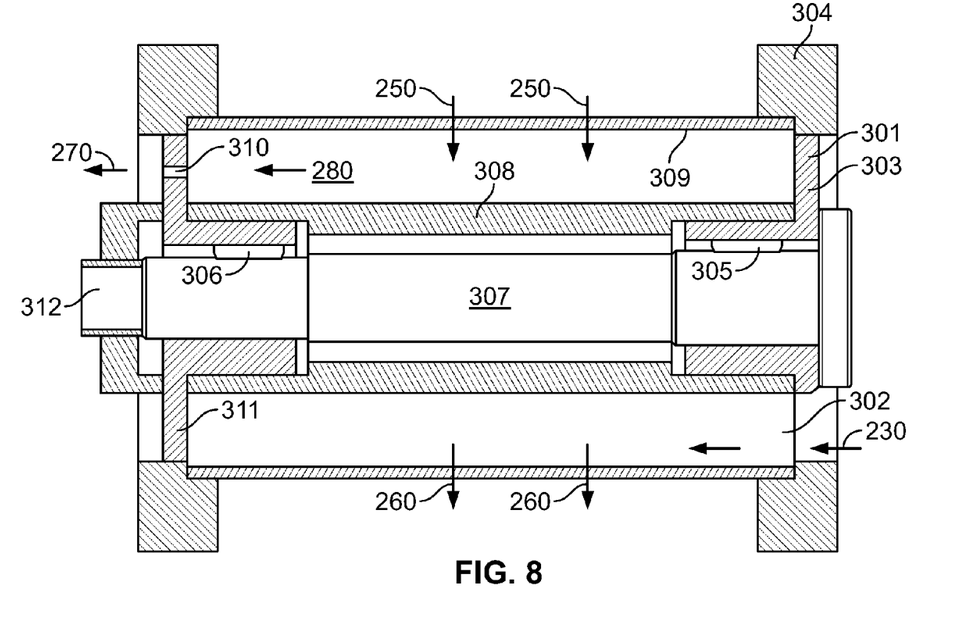
FIG. 8 is a plan view of the alternate embodiment of the self-cleaning filter for a lubricant of FIG. 7 as contemplated within the scope of this disclosure.

In one contemplated embodiment, the body 131 has an external radius of 80 mm and a length of 130 mm. In yet another embodiment, the drain opening 144 or the entry openings 140 can be either oblong or slotted. Finally, in yet another embodiment, the longitudinal channels 143 can be inclined. FIGS. 7-8 show how a notch plate 301 can be used to block one or more of the longitudinal channels 302 with a flat profile instead of a V shape as shown in FIG. 3. FIG. 8 illustrates how the notch plate 301 can operate according to the second embodiment. In one preferred embodiment, the housing encloses the external cavity 271 between an internal surface of the housing 129, an external surface of the filtration media 129, the inlet cover plate 130, and the outlet cover plate 132. FIG. 1 shows how the housing that may be made of polished and anodized cast aluminum and includes a top plate 123, a bottom plate 124, and a center segment 162.

Figure 4:
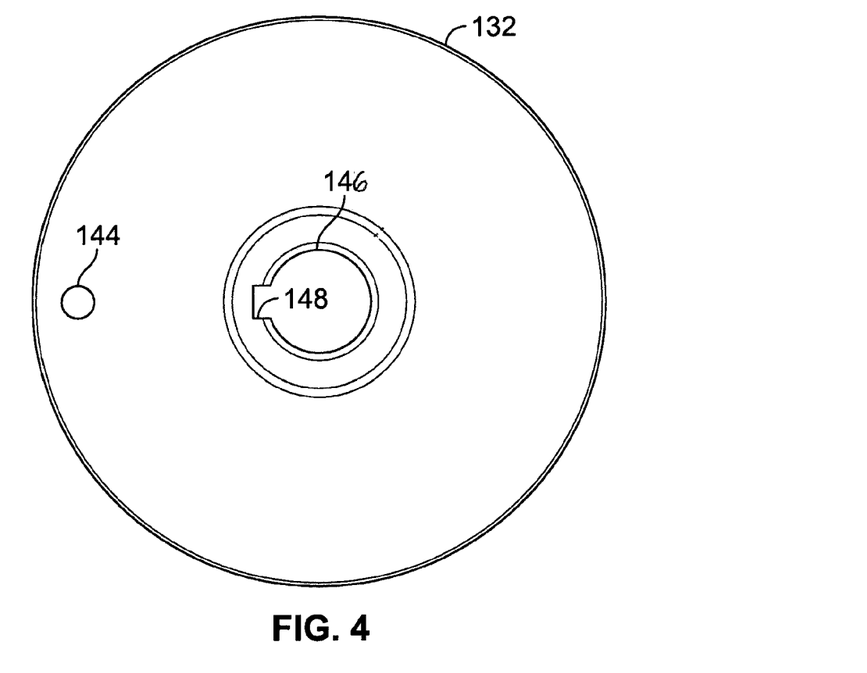
FIG. 4 is an elevation of the outlet cover plate as seen from arrow 4-4 as shown in FIG. 3 according to an embodiment of the present disclosure.
Figure 5:
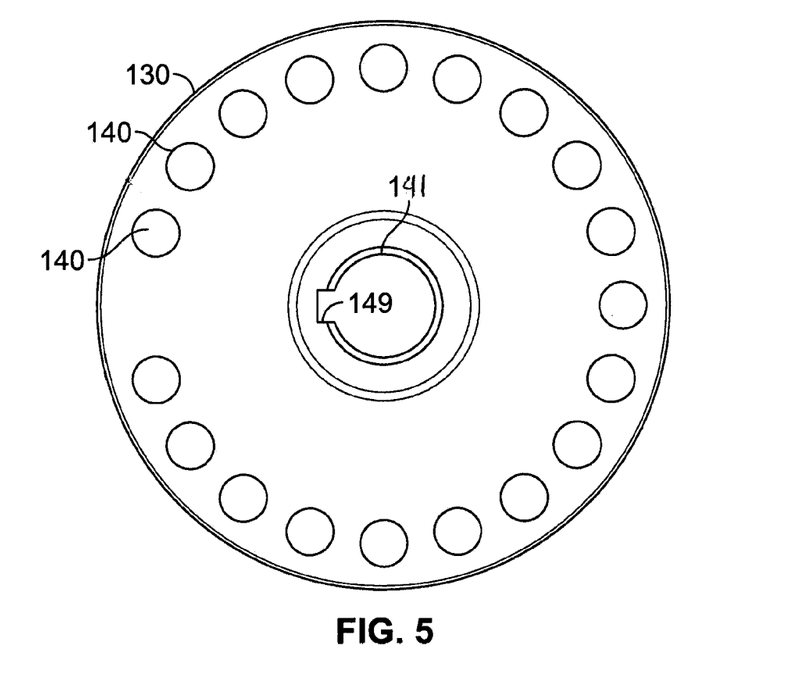
FIG. 5 is an elevation of the inlet cover plate as seen from arrow 5-5 as shown in FIG. 3 according to an embodiment of the present disclosure.

FIG. 1 also shows how different Allen Key accesses 320 or other connectors can be used, such as, in one embodiment (not shown) a drain plug. What is also shown is how the decanter 3 can include a casing made of a cylindrical body 272, a top plate 122, and a bottom plate 121 for storing debris and filtered residue. A device for securing the drive mechanism 4 to the self-cleaning filter 2, such as an attachment head 125 with a control mechanism, can be used. The decanter can also serve to hold the debris while debris free oil is returned via the fourth hose 14 to the source mechanical equipment (not shown). In one preferred embodiment, the flow of oil out of the decanter 3 is about 1% to 8% of the flow of oil through the self-cleaning filter 2. The drive mechanism 4 can also include, a control mechanism for selecting the mode of operation. Returning to FIG. 6, what is also shown is the use of fixation locks 136 to secure the different elements into notches 148 and 149, as shown in FIGS. 4 and 5, respectively. In one embodiment, the end of the drive shaft 134 includes a plate 160 used to interlock with part of the drive mechanism 4. Using the lock nut 145, the threads 135 are placed under compression by turning the nut 145 until the head 137 of the drive shaft holds the outlet cover plate 132 and the inner cover plate 130 over the filtration media 129 into a locked assemble with the body 131. By turning the driving shaft 134, the inlet cover plate 130 and the outlet cover plate 132 are rotated.

It is understood by one of ordinary skill in the art that these different elements correspond to the general elements found in this disclosed system to practice this disclosure. Other auxiliary elements and limitations may be imagined and contemplated to operate this system, but they do not affect the validity and completeness of the disclosure of this system. Persons of ordinary skill in the art appreciate that although the teachings of the disclosure have been illustrated in connection with certain embodiments, there is no intent to limit the invention to such embodiments. On the contrary, the intention of this application is to cover all modifications and embodiments falling fairly within the scope of the teachings of the disclosure.

What is claimed is:

1. A self-cleaning filter for a lubricant, the filter comprising:
   a body including a first end, a second end in opposition, and a plurality of longitudinal channels between the first end and the second end;
   a filtration media external to the body enclosing the plurality of longitudinal channels in contact with a rotating inlet cover plate at the first end, and a rotating outlet cover plate at the second end, wherein the inlet cover plate includes a plurality of entry openings, each in fluidic communication with a different longitudinal channel from the plurality of longitudinal channels, where an unfiltered lubricant is drawn into the different longitudinal channels and filtered out of the different longitudinal channels through the openings and through the filtration media and into an external cavity, leaving filtered debris within the longitudinal channel, wherein the outlet cover plate includes at least one drain opening in fluidic communication with a longitudinal channel without an entry opening for draining the filtered debris away from the longitudinal channel into a decanter; and
   a drive mechanism connected to a drive shaft and the inlet cover plate and the outlet cover plate alternately placing the drain opening in fluidic communication with each of the longitudinal channels.

2. The self-cleaning filter for a lubricant of claim 1, wherein the drive mechanism is a 24-volt DC motor.

3. The self-cleaning filter for a lubricant of claim 1, wherein the drive mechanism is a 12-volt DC motor.

4. The self-cleaning filter for a lubricant of claim 1, further comprising a housing for enclosing the external cavity between an internal surface of the housing, an external surface of the filtration media, the inlet cover plate, and the outlet cover plate.

5. The self-cleaning filter for a lubricant of claim 4, wherein the housing is made of polished and anodized cast aluminum.

6. The self-cleaning filter for a lubricant of claim 1, wherein the lubricant is oil.

7. A self-cleaning filtration system for lubricants, comprising:
   an adapter connected to a piece of mechanical equipment comprising an inlet and an outlet for the transfer of a lubricant in the piece of mechanical equipment, a filter intake, and a filter outtake;
   a self-cleaning filter having a body including a first end, a second end in opposition, and a plurality of longitudinal channels between the first end and the second end, a filtration media external to the body enclosing the plurality of longitudinal channels in contact with a rotating inlet cover plate at the first end and a rotating outlet cover plate at the second end, wherein the inlet cover plate includes a plurality of entry openings, each in fluidic communication with a different longitudinal channel from the plurality of longitudinal channels, where an unfiltered lubricant is drawn into the different longitudinal channels and filtered out of the different longitudinal channels through the openings and through the filtration media and into an external cavity leaving filtered debris within the longitudinal channel, wherein the outlet cover plate includes at least one drain opening in fluidic communication a longitudinal channel without an entry opening for draining the filtered debris away from the longitudinal channel and into a decanter; and a driving mechanism connected to a drive shaft and the body alternately placing the drain opening in fluidic communication with each of the longitudinal channels;
   a first hose connecting the external cavity with the filter outtake,
   a second hose connecting each of the entry openings with the filter intake,
   a third hose connecting the at least one drain opening to the decanter for decantation of the filtered debris in the decanter and return of the oil to the mechanical equipment.

8. The self-cleaning filter system for a lubricant of claim 7, wherein the drive mechanism is a 24-volt DC motor.

9. The self-cleaning filter system for a lubricant of claim 7, wherein the drive mechanism is a 12-volt DC motor.

10. The self-cleaning filtration system of claim 7, further comprising a housing for enclosing the external cavity between an internal surface of the housing, an external surface of the filtration media, the inlet cover plate and the outlet cover plate.

11. The self-cleaning filtration system of claim 10, wherein the housing is made of polished and anodized cast aluminum.

12. The self-cleaning filtration system of claim 7, wherein the lubricant is oil.

13. The self-cleaning filtration system of claim 7, wherein the piece of mechanical equipment is a truck, a car, a boat, or a train engine.

14. The self-cleaning filtration system of claim 13, wherein the decanter flow is from 1% to 8% of the oil flow in the self-cleaning filter.

15. A self-cleaning filtration system for lubricants, comprising:

an adapter connected to a piece of equipment comprising an inlet and an outlet for the transfer of a lubricant in the piece of mechanical equipment, a filter intake, and a filter outtake;

a self-cleaning filter system having a body including a first end, a second end in opposition, and a plurality of longitudinal channels between the first end and the second end, a filtration media external to the body enclosing the plurality of longitudinal channels and in contact with a rotating inlet cover plate at the first end, and a rotating outlet cover plate at the second end, wherein the inlet cover plate includes a notch plate for covering at least one of the longitudinal channels from the plurality of longitudinal channels, where an unfiltered lubricant is drawn into the different longitudinal channels and filtered out of the different longitudinal channels through the filtration media and into an external cavity leaving filtered debris within the longitudinal channel, wherein the outlet cover plate includes a at least one drain opening in fluidic communication the longitudinal channel in contact with the notch plate for draining the filtered debris away from said longitudinal channel and into a decanter; and a driving mechanism connected to a drive shaft and the body alternately placing the drain opening in fluidic communication with each of the longitudinal channels;

a first hose connecting the external cavity with the filter outtake, a second hose connecting each of the entry openings with the filter intake, a third hose connecting the at least one drain opening to the decanter for decantation of the filtered debris in the decanter and return of the oil to the mechanical equipment.

16. The self-cleaning filter for a lubricant of claim 15, wherein the drive mechanism is a 24-volt DC motor.

17. The self-cleaning filter for a lubricant of claim 15, wherein the drive mechanism is a 12-volt DC motor.

18. The self-cleaning filtration system of claim 15, further comprising a housing for enclosing the external cavity between an internal surface of the housing, an external surface of the filtration media, the inlet cover plate, and the outlet cover plate.

19. The self-cleaning filtration system of claim 15, wherein the decanter flow is from 1% to 8% of the oil flow in the self-cleaning filter.

20. The self-cleaning filtration system of claim 15, wherein the piece of mechanical equipment is an automobile engine and the lubricant is engine oil.

* * * * *